United States Patent
Ode et al.

(10) Patent No.: US 11,272,447 B2
(45) Date of Patent: Mar. 8, 2022

(54) RADIO TERMINAL, BASE STATION, AND RADIO COMMUNICATION SYSTEM CONFIGURED TO SCRAMBLE OR SPREAD SIGNAL TRANSMITTED USING LINE IDENTIFICATION INFORMATION RELATED TO SETTING OF HOST LINE BETWEEN BASE STATION AND HOST NODE

(71) Applicant: FUJITSU LIMITED, Kawasaki (JP)

(72) Inventors: Takayoshi Ode, Yokohama (JP);
Yoshiaki Ohta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 23 days.

(21) Appl. No.: 16/653,241

(22) Filed: Oct. 15, 2019

(65) Prior Publication Data
US 2020/0045633 A1 Feb. 6, 2020

Related U.S. Application Data

(63) Continuation of application No. PCT/JP2017/017050, filed on Apr. 28, 2017.

(51) Int. Cl.
*H04W 52/02* (2009.01)
*H04W 76/28* (2018.01)
(Continued)

(52) U.S. Cl.
CPC ... *H04W 52/0216* (2013.01); *H04W 52/0248* (2013.01); *H04W 72/0466* (2013.01); *H04W 76/27* (2018.02); *H04W 76/28* (2018.02)

(58) Field of Classification Search
CPC . H04W 52/0216; H04W 76/28; H04W 76/27; H04W 52/0248; H04W 72/0466; H04W 12/08; H04W 52/02
See application file for complete search history.

(56) References Cited

U.S. PATENT DOCUMENTS

2011/0274040 A1   11/2011   Pani et al.
2011/0286436 A1   11/2011   Suzuki et al.
(Continued)

FOREIGN PATENT DOCUMENTS

EP   2 101 539 A2   9/2009
EP   2 166 806 A1   3/2010
(Continued)

OTHER PUBLICATIONS

3GPP TR 38.804 V14.0.0, "3rd Generation Partnership Project; Technical Specification Group Radio Access Network; Study on New Radio Access Technology; Radio Interface Protocol Aspects," (Release 14), Mar. 2017.
(Continued)

*Primary Examiner* — Justin T Van Roie
(74) *Attorney, Agent, or Firm* — Myers Wolin, LLC

(57) ABSTRACT

A radio terminal includes a radio reception device that receives line identification information related to a setting of a host line between a base station and a host node, and a radio signal from the base station, when a radio line between the radio terminal and the base station is disconnected, and the host line used by the radio terminal to communicate via the base station is maintained, a control device that scrambles or spreads a signal to be transmitted to another communication device or the base station, using the line identification information, and a radio transmission device that transmits the scrambled or spread signal to the base station.

10 Claims, 8 Drawing Sheets

(51) Int. Cl.
*H04W 76/27* (2018.01)
*H04W 72/04* (2009.01)

(56) References Cited

U.S. PATENT DOCUMENTS

| | | |
|---|---|---|
| 2016/0278160 A1 | 9/2016 | Schliwa-Bertling et al. |
| 2018/0249494 A1 | 8/2018 | Matsumoto et al. |
| 2019/0037420 A1 | 1/2019 | Fujishiro et al. |
| 2020/0314667 A1 | 10/2020 | Fujishiro et al. |

FOREIGN PATENT DOCUMENTS

| | | | |
|---|---|---|---|
| JP | 2012-109984 | A | 6/2012 |
| JP | 2013-520103 | A | 5/2013 |
| WO | 2016/148243 | A1 | 9/2016 |
| WO | 2017/170163 | A1 | 10/2017 |

OTHER PUBLICATIONS

Ericsson, "Inactive state in LTE," 3GPP TSG-RAN WG2 #97bis, Tdoc R2-1702560, Agenda Item: 10.2.4.4, Spokane, USA, Apr. 3-7, 2017.

Ericsson, Handling of inactive UEs, 3GPP TSG-RAN WG2 #93bis, Tdoc R2-162760, Agenda Item: 9.2, Dubrovnik, Croatia, Apr. 11-15, 2016.

Sierra Wireless, "Transmission of Data Grant-Free in New State," 3GPP TSG RAN WG2 Meeting #95bis, R2-166059, Agenda item: 9.2.2.1, Kaohsiung, Taiwan, Oct. 10-14, 2016.

Samsung, "Design principles for the new RAN controlled state," 3GPP TSG-RAN WG2 Meeting #95bis, R2-166060, Agenda item: 9.2.2.1, Kaohsiung, Taiwan, Oct. 10-14, 2016.

International Search Report issued for corresponding International Patent Application No. PCT/JP2017/017050, dated Jul. 18, 2017.

Alcatel-Lucent et al, "Commenting contribution on Ericsson's S3-160157 "Security for RRC Connection Suspend and Resume procedure in solution 18 for Narrow Band CIoT"", Agenda Item: 7.15, 3GPP TSG-SA WG3 Meeting #82, S3-160225, Dubrovnik, Croatia, Feb. 1-5, 2016.

NTT Docomo, Inc., "Work on user plane based solution with AS information stored in RAN", Agenda Item: 7.16.2.1, 3GPP TSG-RAN WG2 Meeting #92, R2-156424, Anaheim, USA, Nov. 16-20, 2015.

3GPP TR 23.720 v13.0.0, "3rd Generation Partnership Project; Technical Specification Group Services and System Aspects; Study on architecture enhancements for Cellular Internet of Things (Release 13)", Mar. 2016.

Extended European search report with supplementary European search report and the European search opinion issued by the European Patent Office for corresponding European Patent Application No. 17907742.5, dated Mar. 25, 2020.

Notice of Reasons for Refusal issued by the Japan Patent Office for corresponding Japanese Patent Application No. 2019-515058, dated Dec. 22, 2020, with a full English machine translation.

RADIO TERMINAL, BASE STATION, AND RADIO COMMUNICATION SYSTEM CONFIGURED TO SCRAMBLE OR SPREAD SIGNAL TRANSMITTED USING LINE IDENTIFICATION INFORMATION RELATED TO SETTING OF HOST LINE BETWEEN BASE STATION AND HOST NODE

CROSS-REFERENCE TO RELATED APPLICATIONS

This application is a continuation application of International Application No. PCT/JP2017/017050 filed on Apr. 28, 2017 and designated the U.S., the entire contents of which are incorporated herein by reference.

FIELD

The embodiments discussed herein are related to a radio terminal (or terminal) that performs a radio communication, a base station, a radio communication system, and a radio communication method.

BACKGROUND

In the radio communication system, such as a mobile communication system, a Discontinuous Reception (DRX) function is employed to reduce the power consumption of the radio terminal. For example, in Long Term Evolution (LTE), which is one of radio communication standards for the mobile communication, the radio terminal is put into a wake-up state (or an active state, or a standby state) during a set time interval (for example, a sub-frame) for every period (called DRX period) that is preset for each radio terminal. The radio terminal demodulates and decodes radio resource allocation information (scheduling information) that is transmitted during the wake-up time interval. In addition, the radio terminal refers to the scheduling information, and confirms whether there is an incoming call thereto, based on existence of a resource allocated thereto. On the other hand, the radio terminal turns off at least a circuit part for performing a demodulation process and a decoding process, of a circuit that performs a radio communication process, during time intervals other than the set time interval, to reduce the power consumption.

In addition, in studies of the specifications of the so-called 5th generation mobile communication system by the 3GPP working group, there is a proposal to add a RRC Inactive state as one Radio Resource Control (RRC) state, so as to be able to cope with a pause longer than the DRX. The 5th generation mobile communication system is a standard of the mobile communication subsequent to the LTE and LTE-Advanced.

In the RRC Inactive state, a line (hereinafter referred to as a host line) between the base station and a host node (for example, a line of context or application level) is maintained (set) without being disconnected, even during a time in which the radio terminal stops communicating. On the other hand, a radio line between the base station and the radio terminal is disconnected (for example, refer to Tdoc R2-162760, Ericsson, Handling of inactive UEs, 3GPP TSG-RAN WG2 #93bis, Dubrovnik, Croatia, Apr. 11-15, 2016 (hereinafter referred to as "Non-Patent Document 1"), Tdoc R2-166059, Sierra Wireless, Transmission of Data Grant-Free in New State, 3GPP TSG-RAN WG2 #95bis, Kaohsiung, Taiwan, Oct. 10-14, 2016 (hereinafter referred to as "Non-Patent Document 2"), and Tdoc R2-166060, Samsung, Design principles for the new RAN controlled state, 3GPP TSG-RAN WG2 #95bis, Kaohsiung, Taiwan, Oct. 10-14, 2016 (hereinafter referred to as "Non-Patent Document 3")). A state where the host line and the radio line are set is referred to as a RRC Connected state (or RRC Connected), an a state where the host line and the radio line are disconnected is referred to as a RRC Idle state (or Idle or standby). The RRC Inactive state may be interpreted as being an intermediate state between the RRC Connected state and the RRC Idle state.

A Resume function has been proposed, that enables a part of communication of control information to be omitted when resuming the communication in the RRC Inactive state, by storing line setting information used by the radio terminal for communicating via the base station, and utilizing the stored line setting information when the radio terminal resumes the communication. With regard to the Resume function, the stored line setting information is managed in relation to identification information (hereinafter referred to as Resume ID), for example. Accordingly, when the radio terminal resumes the communication, the Resume ID is transmitted between the radio terminal and the base station, and the radio terminal can resume the communication when the radio terminal and the base station utilize the line setting information corresponding to the same Resume ID. In addition, by utilizing the line setting information and the Resume ID, it is possible to reduce the traffic of the control information that is required when resuming the communication. For example, the Non-Patent Document 2 proposes transmitting uplink user data from the radio terminal to the base station, together with the Resume ID, by Message 3 of a random access procedure, to reduce the number of messages for setting the line transmitted between the radio terminal and the base station. Further, the Non-Patent Document 2 also proposes omitting the random access procedure, to directly transmit the uplink user data together with the Resume ID.

For this reason, by introducing the RRC Inactive state, it is expected that the power consumption will be reduced for devices that communicate at a frequency of once a day or at a lower frequency, for example, such as the so-called Internet of Things (IoT), for example.

However, the Resume ID may be set for each service, and it may be assumed that a plurality of Resume IDs will be allocated with respect to one radio terminal. Consequently, it may be assumed that the number of bits representing the Resume ID will become larger than the number of bits (16 bits) representing a Call-Radio Network Temporary Identifier (C-RNTI) that is used by the base station to identify the radio terminal in the LTE. Further, when the uplink user data and the Resume ID are simultaneously transmitted by the Message 3 of the random access procedure, the amount of information that is transmitted may become large.

In addition, in order to omit the random access procedure, the usable radio resource and transmission timing need to be notified beforehand with respect to each of the plurality of radio terminals, so as to prevent collision of the signals transmitted from the plurality of radio terminals at the base station.

SUMMARY

Accordingly, it is an object in one aspect of the embodiments to provide a radio terminal that can reduce an increase of traffic of control information when the radio terminal transmits data, in a case where a radio line between the radio terminal and a base station is disconnected, and a host line between the base station and a host node, used by the radio terminal to communicate via the base station, is maintained.

According to one aspect of the embodiments, a radio terminal includes a radio reception device configured to receive line identification information related to a setting of a host line between a base station and a host node, and a radio signal from the base station, when a radio line between the radio terminal and the base station is disconnected, and the host line used by the radio terminal to communicate via the base station is maintained; a control device configured to scramble or spread a signal to be transmitted to another communication device or the base station, using the line identification information; and a radio transmission device configured to transmit the scrambled or spread signal to the base station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
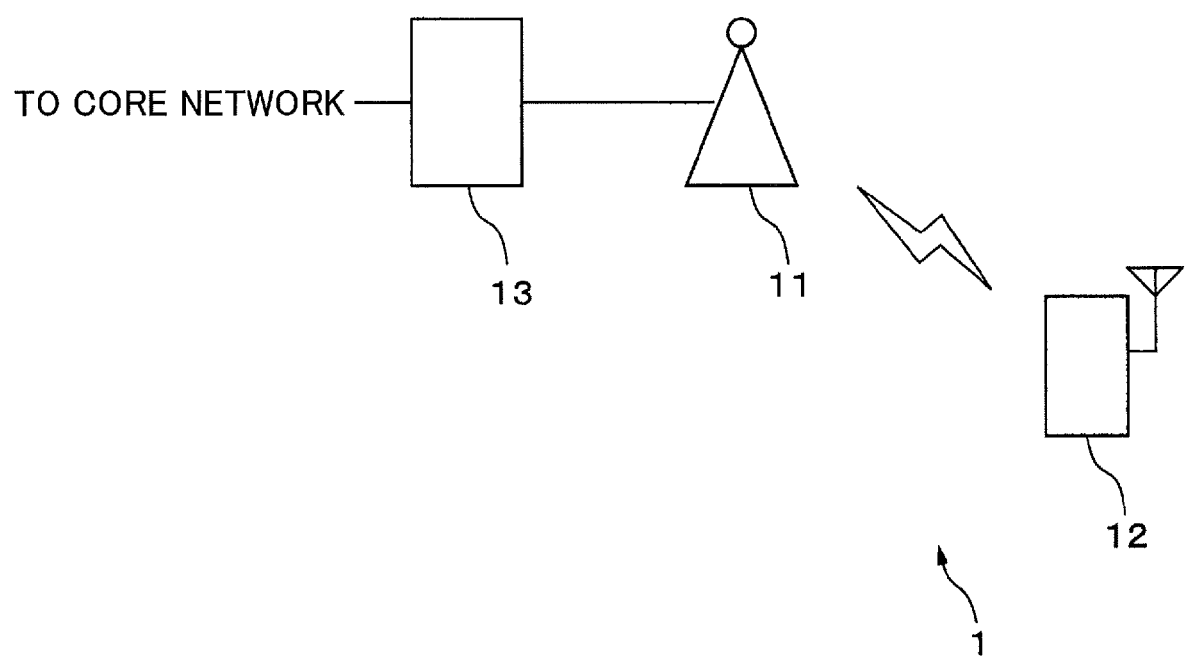
FIG. 1 is a diagram illustrating a general configuration of a radio communication system according to one embodiment.

Preferred embodiments of the present invention will be described with reference to the accompanying drawings.

A radio communication system, a radio terminal utilized in the radio communication system, a base station, and a radio communication method will be described, by referring to the drawings. The radio communication system copes with the Resume function. When transmitting data of the uplink while the radio terminal remains in the RRC Inactive state, the radio terminal scrambles or spreads the uplink data using the Resume ID. In addition, the radio terminal transmits the scrambled or spread uplink data to the base station. Accordingly, it becomes possible to omit an advance notice of a radio resource and a transmission timing when transmitting the uplink data, while the radio terminal remains in the RRC Inactive state. As a result, it becomes possible to reduce the traffic of control information. Further, it becomes possible to reduce collision of uplink signals at the base station.

Line setting information includes at least one of Authentication-related information, Security-related information, and Context-related information, for example. The Authentication-related information includes information related to authentication of SIM information of the radio terminal. In addition, the Security-related information includes information related to an encryption setting used for data communication related to the radio terminal, for example. The Context-related information includes information related to a Quality of Service (QoS) setting (or Quality Class Indicator (QCI) setting), a bearer setting, or a flow setting, for example.

In this specification, a Node B, an eNode B, a gNode B, an access point, or the like are examples of the base station. Further, a mobile station, a mobile terminal, and a User Equipment (UE) are examples of the radio terminal.

According to one embodiment, a radio terminal is provided. This radio terminal includes a radio reception device configured to receive line identification information related to a setting of a host line between a base station and a host node, and a radio signal from the base station, when a radio line between the radio terminal and the base station is disconnected, and the host line used by the radio terminal to communicate via the base station is maintained; a control device configured to scramble or spread a signal to be transmitted to another communication device or the base station, using the line identification information; and a radio transmission device configured to transmit the scrambled or spread signal to the base station.

The radio terminal may include a storage device that stores at least the line identification information. In addition, the radio signal from the base station may include data (user data and control information). The radio signal from the radio terminal may include data (user data and control information). Further, the scrambling or spreading may be referred to as coding (or a coding process).

In the following description, the same holds true unless indicated otherwise.

According to another embodiment, a base station is provided. This base station includes a control device configured to allocate line identification information, related to a setting of a host line between the base station and a host node, to a radio terminal, when a radio line between the radio terminal and the base station is disconnected, and the host line used by the radio terminal to communicate via the base station is maintained; and a radio processor configured to notify the allocated line identification information to the radio terminal, and receive a scrambled or spread signal transmitted from the radio terminal. The control device descrambles or despreads the received signal using the line identification information.

The control device may include a allocation unit that controls or selects the line identification information. In addition, the control device may include a storage device that stores at least one of the line identification information, and the line setting information, specified by the line identification information, for setting the host line. Moreover, the radio signal from the base station may include data (user data and control information). The radio signal from the radio terminal may include data (user data and control information). Further, the descrambling or despreading may be referred to as decoding (or a decoding process).

In the following description, the same holds true unless indicated otherwise.

According to still another embodiment, a radio communication system, including a base station and a radio terminal, is provided. In this radio communication system, the radio terminal uses line identification information related to a setting of a host line between the base station and a host node, to scramble or spread a signal to be transmitted to another communication device or the base station, when a radio line between the radio terminal and the base station is disconnected, and the host line used by the radio terminal to communicate via the base station is maintained. In addition, the radio terminal transmits the scrambled or spread signal to the base station. The base station uses the line identification information to descramble or despread the scrambled or spread signal received from the radio terminal.

According to a further embodiment, a radio communication method, that is implemented in a radio communication system including a base station and a radio terminal, is provided. This radio communication method includes scrambling or spreading, by the radio terminal, a signal to be transmitted to another communication device or the base station, using line identification information related to a setting of a host line between the base station and a host node, when a radio line between the radio terminal and the base station is disconnected, and the host line used by the radio terminal to communicate via the base station is maintained; transmitting, by the radio terminal, the scrambled or spread signal to the base station; and descrambling or despreading, by the base station, the scrambled or spread signal received from the radio terminal, using the line identification information.

FIG. 1 is a diagram illustrating a general configuration of the radio communication system according to one embodiment. A radio communication system 1 includes a base station 11, a radio terminal 12, and a host node 13. The base station 11 and the radio terminal 12 transmit signals between each other by radio communication. The number of base stations 11 included in the radio communication system 1 is not limited to 1, and the radio communication system 1 may include a plurality of base stations 11. Similarly, the radio communication system 1 may include a plurality of radio terminals 12. In addition, the radio terminal 12 may be a mobile terminal, or a stationary type communication device. The host node 13 is a device or the like forming a core network, such as a Mobility Management Entity (MME), a Serving Gate Way (SGW, S-GW), a PDN Gate Way (PGW, P-GW), or the like of LTE, for example, but is not dependent upon a particular system such as the LTE system.

The base station 11 relays the communication between the radio terminal 12 and the host node 13. For this reason, the base station 11 is connected to the host node 13 according to a predetermined communication standard prescribed for the communication between the host node 13 and the base station 11, such as the S1 interface of the LTE system, for example. In addition, the base station 11 may be connected to another base station according to a predetermined communication standard prescribed for the communication between the base stations, such as the X2 interface of the LTE system. These connections are examples, and the communication standard or name is not particularly limited, as long as the interface connects the host node and the base station, or the interface connects the base stations. The same also holds true in the following.

The base station 11 sets 1 or more cells. For example, when the radio terminal 12 is located in one of the cells set by the base station 11, the radio terminal 12 becomes radio communicable with the base station 11. Thus, the base station 11 performs a procedure to set a radio line and a procedure to set a host line, such as a random access procedure, between the radio terminal 12 that is radio communicable with the base station 11. Thereafter, the base station 11 receives a communication signal having the radio terminal 12 as a destination thereof, from the core network via the host node 13, to transmit the communication signal to the radio terminal 12 as a downlink radio signal. In addition, the base station 11 receives an uplink radio signal from the radio terminal 12, and extracts the communication signal for another communication device (not illustrated), included in the received radio signal, to transmit the extracted communication signal to the host node 13.

Moreover, in order to enable the radio terminal 12 to use the Resume function, the base station 11 adds line identification information (for example, Resume ID, and hereinafter described as the Resume ID) to the line setting information related to the radio terminal 12. Alternatively, the base station 11 selects the line identification information to be allocated to the terminal, from a plurality of line identification information, and allocates (or controls) the selected line identification information for each line setting (or for each radio terminal, or for each service). The base station 11 stores the line setting information together with the corresponding Resume ID. Further, the base station 11 notifies the Resume ID (or line identification information) to the radio terminal 12, while the radio terminal 12 continues the radio communication with the base station 11, that is, while the radio terminal 12 is in the RRC Connected state.

Thereafter, when the radio terminal 12 in the RRC Inactive state resumes the communication, the base station 11 utilizes the line setting information identified by the Resume ID allocated with respect to the radio terminal 12, to relay the communication between the radio terminal 12 and the host node 13.

The radio terminal 12 is a radio terminal that can utilize the Resume function, and assumes the RRC Inactive state to stop the communication, after the host lie is set in the RRC Connected state, for example. In other words, even when the radio line between the radio terminal 12 and the base station 11 is disconnected, the host line related to the radio terminal 12 is in a maintained state (or set state). In addition, the line setting information and/or the line identification for the radio terminal 12 is held and managed by the base station 11. Further, when a predetermined period (for example, several hours, several days, 1 month, or the like) or a particular event is generated, the radio terminal 12 utilizes the line setting information held in the base station 11, to reconnect the radio line, and resume the communication with another communication device (not illustrated). For this reason, the radio terminal 12 stores the Resume ID (or line identification information) notified from the base station 11 while in the RRC Connected state. Moreover, the radio terminal 12 scrambles or spreads the uplink data using the Resume ID, when transmitting the uplink data while in the RRC Inactive state.

The host node 13 is at least one of a Serving Gateway (S-GW, SGW), a Mobility Management Entity (MME), and a Packet data network Gateway (P-GW, PGW), for example, and relays the communication between the core network and the base station 11. Further, the host node 13 performs at least one of control related to position registration of the radio terminal 12, handover between the base stations, or the like, control related to the QoS, and control related to accounting or the like. In addition, the host node 13 may perform control related to the host line, such as establishment or deletion of the bearer.

Next, a radio communication process that is performed using the Resume function, while the radio terminal 12 is in the RRC Inactive state, will be described in more detail. In this embodiment, the radio communication system 1 can utilize at least one of the following 2 communication procedures.

(1) Communication Procedure 1:

The random access procedure is omitted, and when the radio terminal 12 requests reconnection with respect to the base station 11, the uplink data that is scrambled or spread using the Resume ID, is transmitted.

(2) Communication Procedure 2:

After performing a simplified random access procedure, when the radio terminal 12 requests reconnection with respect to the base station 11, the uplink data that is scrambled or spread using the Resume ID, is transmitted.

The communication procedure 1 is utilized to transmit a relatively small amount of data, for example. Alternatively, the communication procedure 1 is utilized for the transmission when a packet size to be transmitted is smaller than or equal to a threshold value. On the other hand, the communication procedure 2 is utilized to transmit an amount of data larger than the amount of data transmitted by the communication procedure 1, or for the transmission when the packet size to be transmitted is larger than the threshold value. However, the above described relationships between each communication procedure and the amount of data are merely examples, and for example, the communication procedure 2 may be utilized to transmit a relatively small amount of data. Alternatively, the communication procedure to be used may be selected from the communication procedures 1 and 2, according to the kind of service that is provided or the QoS specified by the line setting information.

Figure 2:
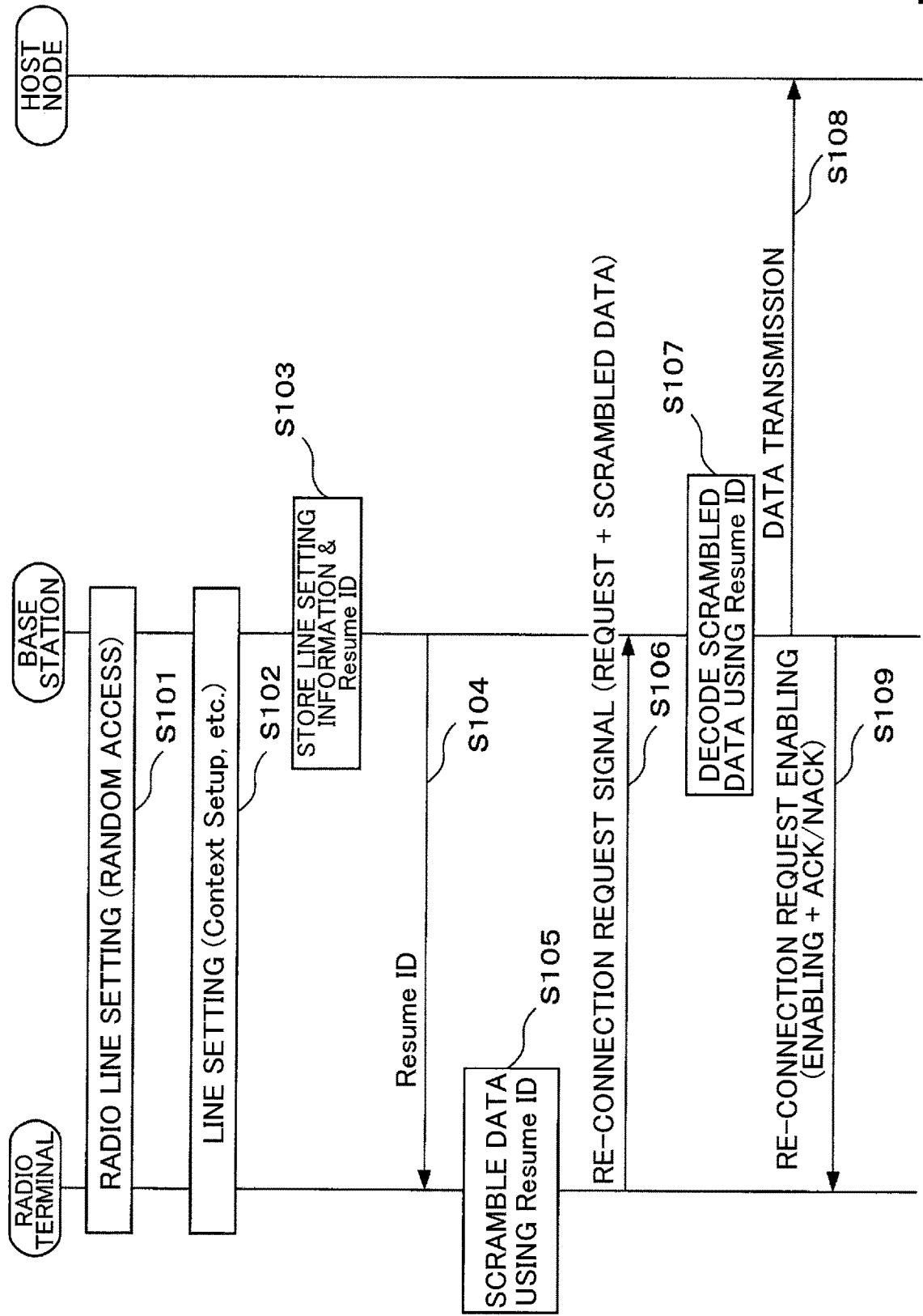
FIG. 2 is a sequence diagram of a radio communication process according to one example of a communication procedure.

FIG. 2 is a sequence diagram of the radio communication process according to the communication procedure 1. In the sequence diagram described below, it is assumed that the radio terminal 12 scrambles the uplink data using the Resume ID, and transmits the scrambled data to the base station 11. When spreading the uplink data using the Resume ID, the radio communication process may be performed according to a sequence similar to that of the sequence diagram described in the following. In addition, the uplink data is an example of the signal that is transmitted to another communication device.

The base station 11 and the radio terminal 12 perform a radio line setting process according to the random access procedure (step S101). Further, the base station 11 and the radio terminal 12 perform a line setting process including a host line setting such as Context setup or the like, together with the host node 13 (step S102).

The base station 11 allocates the Resume ID to the line setting information with respect to the radio terminal 12, and stores the Resume ID together with the line setting information (step S103). The base station 11 may allocate a different Resume ID for each radio terminal, or allocate a different Resume ID for each radio terminal receiving the same service that is provided. Alternatively, the base station 11 may allocate a different Resume ID for each cell in which the radio terminal 12 is located. In addition, the base station 11 notifies the Resume ID to the radio terminal (step S104). In this case, the base station 11 may notify the Resume ID via a Physical Downlink Control Channel (PDCCH) or a Physical Downlink Shared Channel (PDSCH), for example. The radio terminal 12 stores the Resume ID notified thereto.

Thereafter, when a situation in which the radio terminal 12 transmits the uplink data occurs after the radio terminal 12 makes a transition from the RRC Connected state to the RRC Inactive state, the radio terminal 12 scrambles the data using the Resume ID (step S105). In addition, the radio terminal 12 generates a reconnection request signal, including the scrambled uplink data and requesting reconnection with respect to the base station 11, and transmits the reconnection request signal to the base station 11 (step S106). The radio terminal 12 may transmit the data, scrambled using the Resume ID, to the base station 11 as the reconnection request signal, or transmit the data, scrambled using the Resume ID, to the base station 11 in place of the reconnection request signal.

The base station 11 performs a descrambling process, to decode the scrambled uplink data included in the received reconnection request signal, using the Resume ID allocated to the radio terminal 12 (step S107). In addition, the base station 11 transmits the decoded data to the host node 13 (or another base station) (step S108). Further, the base station 11 generates a reconnection enabling signal enabling the reconnection, including an acknowledge signal (ACK or NACK) indicating whether the uplink data is received, and transmits the generated reconnection enabling signal to the radio terminal 12 (step S109). The base station 11 may transmit the acknowledge signal to the radio terminal 12 as the reconnection enabling signal, or transmit the acknowledge signal to the radio terminal 12 in place of the reconnection enabling signal. Then, the radio communication process of the base station 11 and the radio terminal 12 ends.

According to the communication procedure 1, even when a plurality of radio terminals simultaneously transmit reconnection request signals, the base station 11 can decode the reconnection request signal for each radio terminal. For this reason, the radio terminal 12 can transmit the data, without allocating a usable radio resource or notifying a transmission timing, in advance from the base station 11 with respect to the radio terminal 12.

In this case, the base station 11 cannot know in advance the timing at which the radio terminal 12 transmits the reconnection request signal. Hence, the base station 11 may perform the descrambling process with respect to the received signal using the Resume ID, for each Resume ID stored in the base station 11, for each sub-frame. Hence, in a case where the received signal is the reconnection request signal from a radio terminal and including the scrambled data, the base station 11 can descramble (or decode) the scrambled data.

Figure 3:
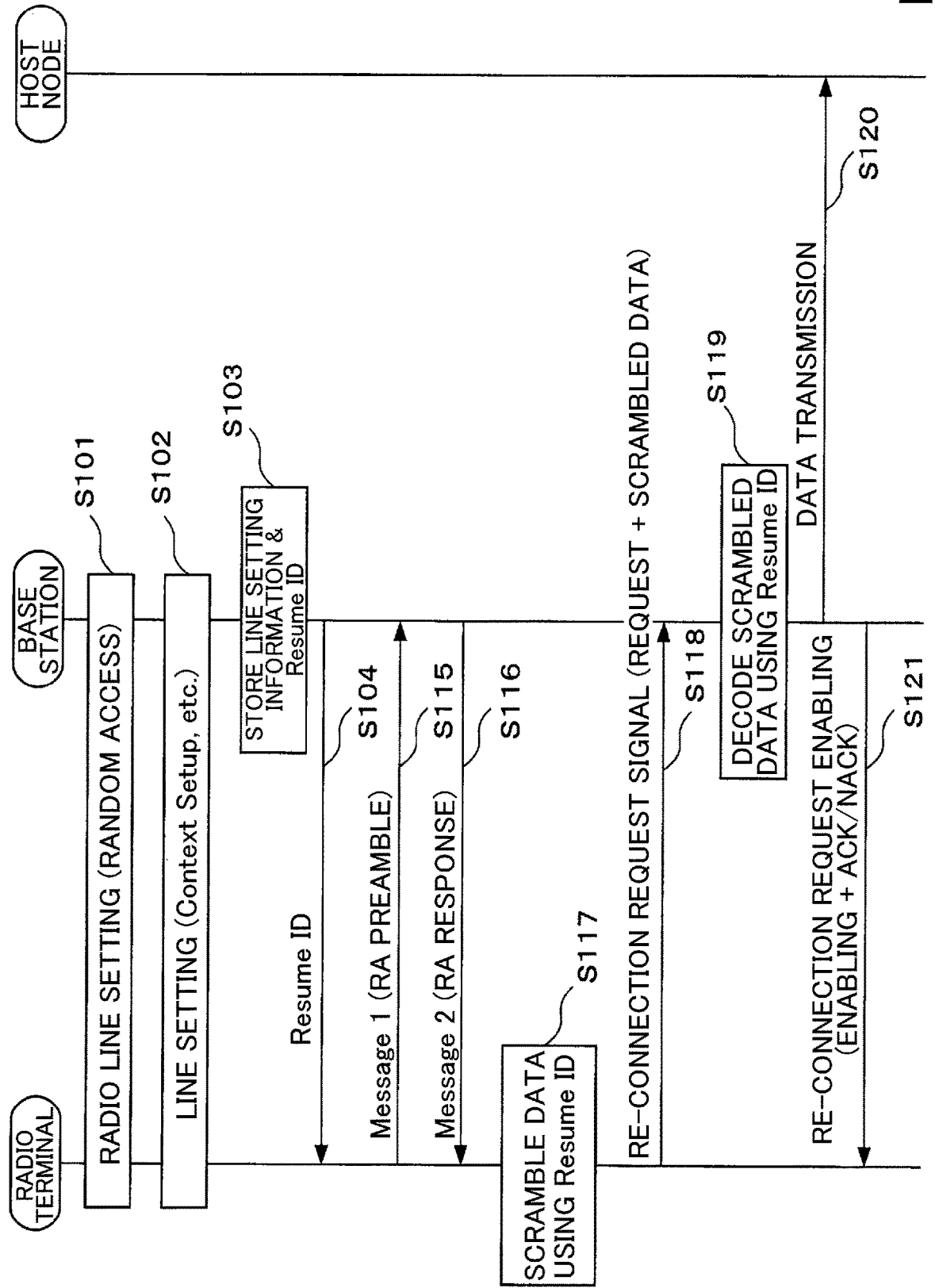
FIG. 3 is a sequence diagram of the radio communication process according to another example of the communication procedure.

FIG. 3 is a sequence diagram of the radio communication process according to the communication procedure 2. In the sequence diagram described below, it is also assumed that the radio terminal 12 scrambles the uplink data using the Resume ID, and transmits the scrambled data to the base station 11. When spreading the uplink data using the Resume ID, the radio communication process may be performed according to a sequence similar to that of the sequence diagram described in the following. Processes of step S115 and subsequent steps in the sequence illustrated in FIG. 3 are different from the sequence illustrated in FIG. 2. Hence, the processes of step S115 and subsequent steps will be described in the following.

After step S104, when the situation in which the radio terminal 12 transmits the uplink data occurs after the radio terminal 12 makes the transition from the RRC Connected state to the RRC Inactive state, the radio terminal 12 generates a Message 1 including a RA preamble. In addition, the radio terminal 12 transmits the Message 1 to the base station 11, using the radio resource for a Physical Random Access Channel (PRACH) indicated by signaling information from the base station 11 (step S115). The base station 11 transmits a RA response, that is response information with respect to the RA preamble, to the radio terminal 12 as a Message 2, when the RA preamble is detected (step S116). The RA response includes Timing Advance (RA) information for adjusting the timing at which the radio terminal 12 transmits the uplink signal. The radio terminal 12 refers to the TA information, and establishes a strict temporal synchronization with the base station 11. In addition, the radio terminal 12 receives an uplink (UL) Scheduling Grant from the base station 11. The UL Scheduling Grant includes information indicating an uplink resource block allocated to the radio terminal 12, or the like.

The radio terminal 12 scrambles the uplink data using the Resume ID (step S117). In addition, the radio terminal 12 generates the reconnection request signal, including the scrambled uplink data and requesting reconnection with respect to the base station 11. Further, the radio terminal 12 transmits the generated reconnection request signal to the base station 11, using the resource specified by the UL Scheduling Grant (step S118).

The base station 11 performs a descrambling process, to decode the scrambled uplink data included in the received reconnection request signal, using the Resume ID allocated to the radio terminal 12 (step S119). In addition, the base station 11 transmits the decoded data to the host node 13 (or another base station) (step S120). Further, the base station 11 generates the reconnection enabling signal enabling the reconnection, including the acknowledge signal (ACK or NACK) indicating whether the uplink data is received, and transmits the generated reconnection enabling signal to the radio terminal 12 (step S121). Then, the radio communication process of the base station 11 and the radio terminal 12 ends.

Even in the case where the uplink data is transmitted according to the random access procedure, a plurality of radio terminals may transmit the Message 1 including the same RA preamble to the base station 11. In this case, each of the plurality of radio terminals may receive the RA response transmitted from the base station 11, as a message having each of the plurality of radio terminals as a destination thereof. For this reason, in step S118, there is a possibility that the plurality of radio terminals will transmit the reconnection request signals using the same resource. However, according to the communication procedure 2, the uplink data is scrambled using the Resume ID and transmitted. Hence, the base station 11 can use the original destination of the RA response, that is, the Resume ID allocated to the radio terminal enabled the reconnection, to decode the data included in the reconnection request signal from the radio terminal enabled the reconnection, among the reconnection request signals that are received.

According to a modification of the communication procedure 2, one or a plurality of usable RA preambles may be set in advance for each Resume ID. In addition, the radio terminal 12, in step S115, may select the RA preamble to be used, from among the RA preambles set for the Resume ID allocated thereto, and transmit the Message 1 including the selected RA preamble to the base station 11.

According to this modification, it is possible to reduce the probability that the plurality of radio terminals will perform the random access procedures by specifying the same RA preamble.

According to another modification of the communication procedure 2, the radio terminal 12 may also scramble or spread the RA preamble using the Resume ID. In addition, the radio terminal 12, in step S115, may transmit the Message 1, including the scrambled or spread RA preamble, to the base station 11. The RA preamble is an example of the signal transmitted to the base station 11.

According to this other modification, the base station 11 can decode the RA preamble of each of the plurality of radio terminals, even when the plurality of radio terminals simultaneously transmit the Message 1.

Further, according to the communication procedure 2, in a case where the RA preamble is scrambled or spread using the Resume ID, the base station 11 can identify the radio terminal 12 that transmitted the RA preamble, and also identify the Resume ID allocated to the radio terminal 12. For this reason, the radio terminal 12 may omit the scrambling process or a spreading process of step S117 with respect to the uplink data. In addition, the radio terminal 12, in step S118, may transmit the reconnection request signal, including the uplink data that is not scrambled nor spread, to the base station 11.

Moreover, in each of the communication procedures and the modifications described above, the radio terminal 12 may generate a scramble code using the Resume ID, and scramble the uplink data or the RA preamble using the generated scramble code. Alternatively, the radio terminal 12 may generate a spread code using the Resume ID, and spread the uplink data or the RA preamble using the generated spread code.

When scrambling the data, the radio terminal 12 may scramble the data according to a method prescribed in section 6.7.1 of LTE TS36.211 V8.9.0 developed by the 3GPP, for example. In other words, the radio terminal 12 may divide the data to be scrambled for every 32-bit bit-string, and compute a modulo 2 of a value that is obtained by adding the scramble code that is created as a 32-bit Gold code for each divided bit-stream. Hence, the radio terminal 12 may create the Gold code by combining two 31-bit Pseudo Noise (PN) sequences $PN(x_1)$ and $PN(x_2)$ according to a method described in section 7.2 of TS36.211 V8.9.0, for example. In this case, the radio terminal 12 may regard $x_1(0)=0$, $x_1(n)=1$ ($n=1, 2, \ldots, 30$) as an initial value of $PN(x_1)$, as described in section 7.2. On the other hand, the radio terminal 12 may regard a binarized Resume ID (for example, $y_1 y_2 \ldots y_m$) as an initial value of $PN(x_2)$.

Further, when spreading the data, the radio terminal 12 may spread the data using an Orthogonal Variable Spreading Factor (OVSF) code as the spread code. In this case, the radio terminal 12 may compute a modulo 2 of a bit-stream (for example, a bit-stream obtained by multiplying $c(n*i+j)$ ($j=0, 1, \ldots, n-1$) bits of the OVSF code to an ith bit $b(i)$ of the data) that is obtained by multiplying n bits of the OVSF code, for each bit of the data to be transmitted, for example. Here, n is a spreading ratio that is set to an integer greater than or equal to 2, for example. The OVSF code is described in section 4.3.1.1 of TS25.213 V8.5.0 that is the specifications of W-CDMA developed by the 3GPP, for example. The radio terminal 12 may spread the data using the Gold code as the spread code, instead of using the OVSF code.

In addition, the radio terminal 12 may perform both the scrambling and the spreading with respect to the data to be transmitted. In this case, the radio terminal 12 may divide the data to be transmitted for every bit-string having a predetermined length (for example, 4 bits), perform the scrambling using a scramble code having a predetermined length for each divided bit-string, and thereafter perform the spreading using a spread code having a predetermined spread ratio (for example 4).

Instead of using the Gold code or the OVSF code described above, the radio terminal 12 may use, as the scramble code or the spread code, a PN sequence or a Zadoff-Chu sequence that is generated using the Resume ID as the initial value, for example.

Alternatively, in each of the communication procedures and the modifications described above, the radio terminal 12 may generate the scramble code using both the Resume ID and an identification number of the radio terminal 12, and scramble the uplink data or the RA preamble using the generated scramble code. On the other hand, the radio terminal 12 may generate the spread code using both the Resume ID and the identification number of the radio terminal 12, and spread the uplink data or the RA preamble using the generated spread code.

In this case, a Cell-Radio Network Temporary Identifier (C-RNTI), an International Mobile Subscriber Identity (IMSY), or a Temporary Mobile Subscriber Identify (TMSI), for example, may be used as the identification number of the mobile terminal 12. The identification number of the radio terminal 12 may be prestored in a storage device of the radio terminal 12, or notified from the base station 11 to the radio terminal 12, for example.

The radio terminal 12 in this case may also use at least one of the Gold code, the OVSF code, the PN code, and the Zadoff-Chu code or the like, for example, as the scramble code or the spread code. For example, when the Gold code is used as the scramble code or the spread code, the radio terminal 12 may create the Gold code by combining two 31-bit PN sequences $PN(x_1)$ and $PN(x_2)$, similar to the case described above. In this case, the radio terminal 12 may regard $x_2(0)=0$, $x_1(n)=1$ ($n=1, 2, \ldots, 30$) as the initial value of $PN(x_1)$, as described in section 7.2. On the other hand, the radio terminal 12 may regard a combined value ($y_1 y_2 \ldots y_m z_2 z_2 \ldots z_k$ or $z_1 z_2 \ldots z_k y_1 y_2 \ldots y_m$), that is created by combining the binarized Resume ID (for example, $y_1 y_2 \ldots y_m$) and a binarized identification number (for example, $z_1 z_2 \ldots z_k$) of the radio terminal, as the initial value of $PN(x_2)$. Alternatively, the radio terminal 12 regard the OVSF code, the PN code, or the Zadoff-Chu code, that is generated by regarding the created combined value as the initial value, as the scramble code or the spread code.

Accordingly, by creating the scramble code or the spread code using the Resume ID and the identification number of the radio terminal 12, the scramble code or the spread code becomes unique for each radio terminal 12, even in a case where the Resume ID is allocated for each service. For this reason, even in the case where the Resume ID is allocated for each service, the base station 11 can decode the uplink data or the RA preamble transmitted from each of the plurality of radio terminals 11.

The base station 11 may also use the scramble code or the spread code that is created according to a method similar to that employed by the radio terminal 12, to descramble or despread the RA preamble or the uplink data, that is scrambled or spread and received from the radio terminal 12.

In the embodiment described above, and particularly in the communication procedure 1, the base station 11 performs the descrambling process or the despreading process for each Resume ID allocated to the radio terminal in the RRC Inactive state, among the one or more Resume IDs that are stored, for every receivable timing of the radio signal. Accordingly, as the number of Resume IDs stored in the base station 11 increases, the number of computation resources required for the descrambling process or the despreading process increases.

Hence, according to the modifications, a range of possible values for the Resume ID may be divided into a plurality of sub-ranges. A timing when the transmission is possible (hereinafter also simply referred to as a transmittable timing or a transmission timing) may be set for each sub-range. For example, a predetermined sub-frame within the frame may be set as the transmission timing corresponding to the sub-range, for each sub-range. Accordingly, the number of Resume IDs that are simultaneously subjected to the descrambling process or the despreading process can be reduced, to reduce the number of computation resources required for the descrambling process or the despreading process.

The base station 11 may signal (notify) the control information, related to the sub-range of the divided Resume ID and/or the transmission timing for each sub-range, with respect to the radio terminal 12, or notify the radio terminal similar to the line identification information. In addition, the control information, related to the sub-range of the divided Resume ID and/or the transmission timing for each sub-range, may be stored in a Subscriber Identify Module (SIM) card that stores a telephone number or the like. Alternatively, the radio terminal 12 may read the control information from the SIM card when performing an initial setting of the radio terminal 12, and store the read control information in a storage device of the radio terminal 12.

The number of transmittable timings during a predetermined time may have sub-ranges that are different or the same, or may be different for each sub-range. For example, a priority may be set for each sub-range, and the transmittable timing may be set for each sub-range, so that the number of transmittable timings becomes larger as the priority of the sub-range becomes higher. In this case, the priority may be set based on the kind, urgency, or QoS (particularly an extent of tolerable delay) of the service, for example. For example, the priority may be set so that the priority becomes higher as the urgency becomes higher or the tolerable delay becomes smaller.

Suppose that the Resume ID is allocated for each service, for example. In this case, with regard to the sub-range corresponding to the service having a relatively high urgency (for example, a service utilized to notify an abnormality detection or a failure detection), all of the sub-frames that can be utilized for the uplink transmission within the frame may be the transmittable timing. On the other hand, with regard to the sub-range corresponding to the service having a relatively low urgency (for example, a service utilized for data collection), a predetermined sub-frame among one or a plurality of frames may be the transmittable timing.

When allocating the Resume ID, the base station 11 may allocate the Resume ID included in the sub-range corresponding to the service, according to the service provided to the radio terminal 12.

Similarly, when allocating the Resume ID for each radio terminal, with regard to the sub-range corresponding to the service having the relatively high urgency, all of the sub-frames that can be utilized for the uplink transmission within the frame may be the transmittable timing. On the other hand, with regard to the sub-range corresponding to the service having the relatively low urgency, a predetermined sub-frame among one or a plurality of frames may be the transmittable timing.

When allocating the Resume ID, the base station 11 may allocate the Resume ID included in the sub-range corresponding to the priority, according to the priority of the radio terminal 12.

Figure 4:
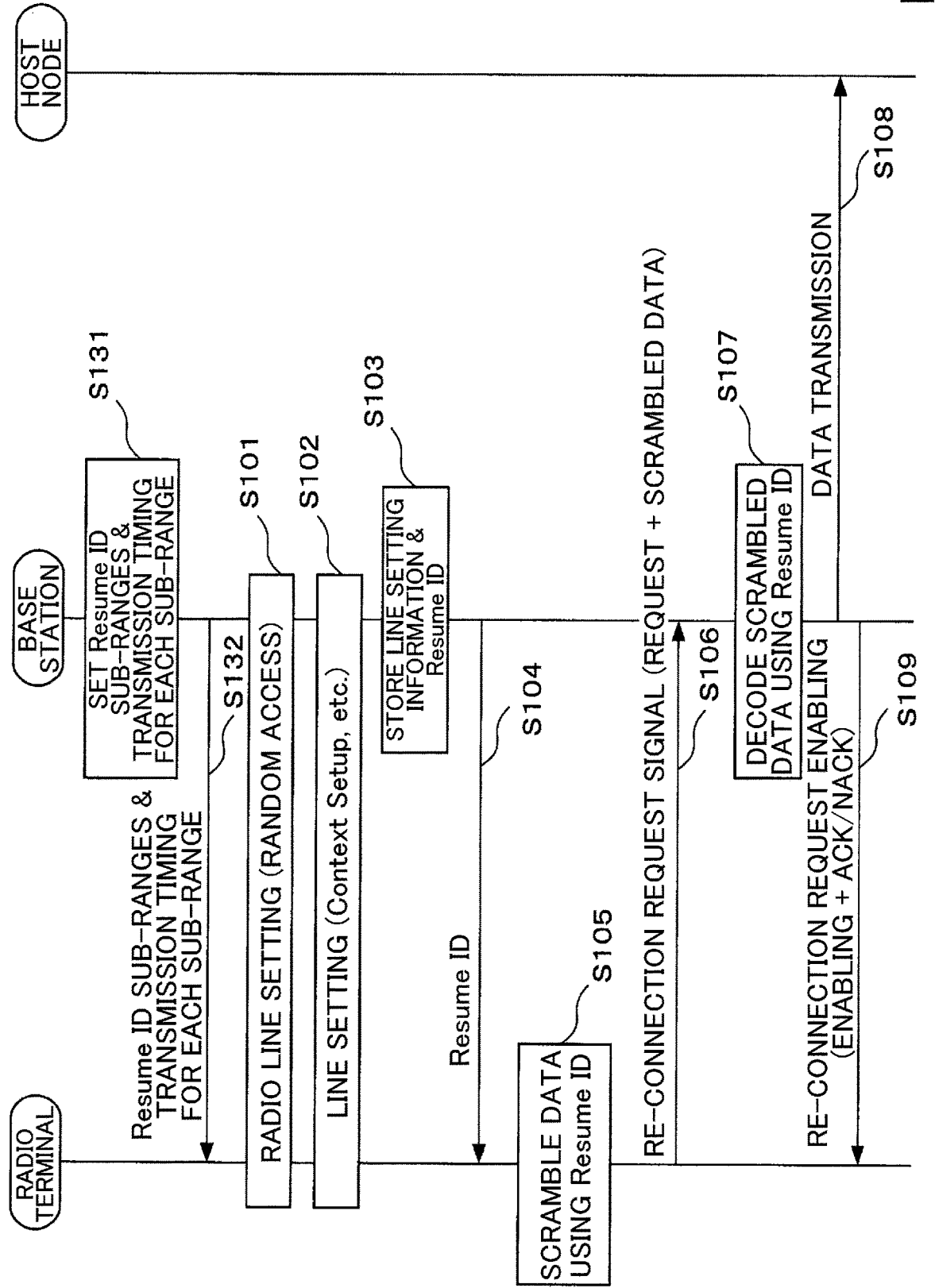
FIG. 4 is a sequence diagram of the radio communication process according to still another example of the communication procedure.

FIG. 4 is a sequence diagram of the radio communication process according to still another example of the communication procedure. In the sequence diagram described below, it is assumed that the radio terminal 12 scrambles the uplink data using the Resume ID, and transmits the scrambled data to the base station 11. When spreading the uplink data using the Resume ID, the radio communication process may be performed according to a sequence similar to that of the sequence diagram described in the following. Processes of step S131 and step S132 performed before step S101 in the sequence illustrated in FIG. 4 are different from the sequence illustrated in FIG. 2. Hence, the processes of step S131 and step S132 will be described in the following.

The base station 11 divides the range of possible values for the Resume ID into the plurality of sub-ranges, to set the plurality of sub-ranges. In addition, the base station 11 sets the transmission timing of the sub-ranges, for each sub-range (step S131). Further, the base station 11 signals (or notifies) each sub-range, and the transmission timing for each sub-range, to the radio terminal 12 via a signaling channel (step S132). After step S132, the base station 11 and the radio terminal 12 perform the processes of step S101 and subsequent steps.

Instead of performing the process of step S132, the base station 11, in step S104, may notify the Resume ID allocated to the radio terminal 12, and the transmission timing that is set for the sub-range to which the allocated Resume ID belongs, to the radio terminal 12. Alternatively, the base station 11, in step S104, may notify the Resume ID allocated to the radio terminal 12, each sub-range, and the transmission timing that is set for each sub-range, to the radio terminal 12. On the other hand, the base station 11, before or after step S104, may notify, separately from the Resume ID allocated to the radio terminal 12, the transmission timing that is set for the sub-range to which the allocated Resume ID belongs, or each sub-range and the transmission timing that is set for each sub-range, to the radio terminal 12.

Next, details of the base station 11 and the radio terminal 12 used in the embodiment and the modifications described above will be described.

Figure 5:
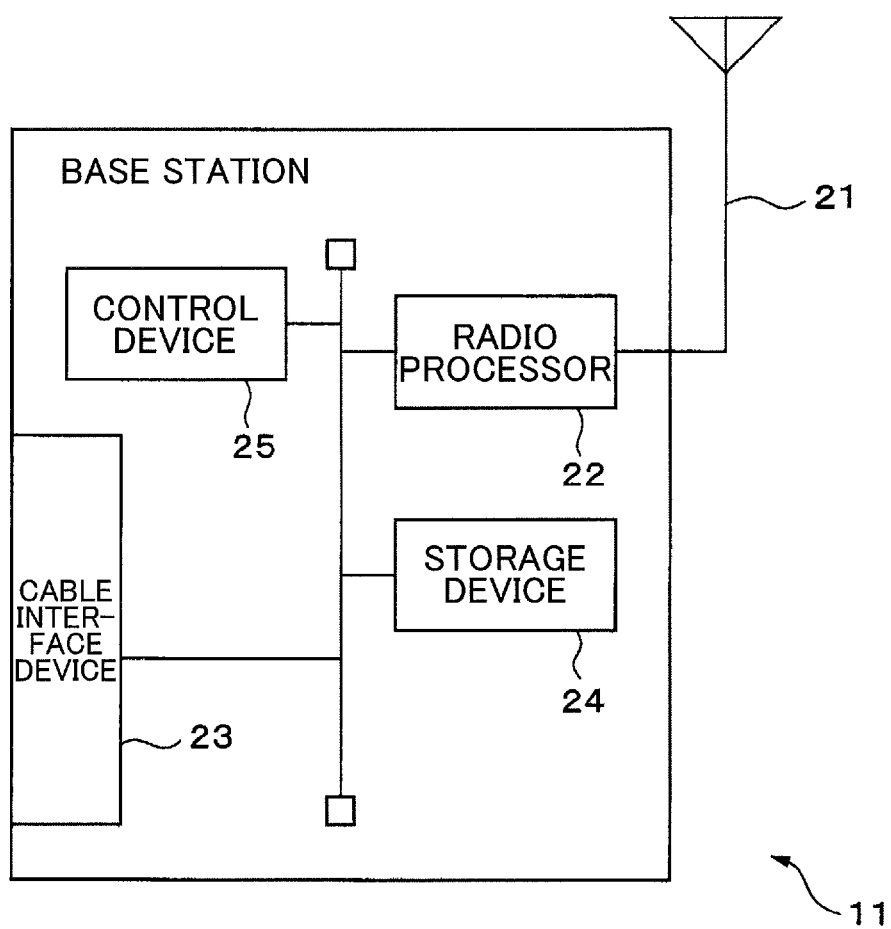
FIG. 5 is a diagram illustrating a general configuration of a base station.

FIG. 5 is a diagram illustrating a general configuration of the base station 11. The base station 11 includes an antenna 21, a radio processor 22, a cable interface device 23, a storage device 24, and a control device 25. The radio processor 22, the storage device 24, and the control device 25 may be formed as separate circuits, respectively. Alternatively, each of these parts may be formed by one or a plurality of integrated circuits in which circuits corresponding to these parts are integrated, and the base station 11 may be mounted with such one or plurality of integrated circuits.

The antenna 21 transmits a downlink signal transferred via the radio processor 22, as the radio signal. In addition, the antenna 21 receives and converts the radio signal including the uplink signal from the radio terminal 12 into an electrical signal, and transfers the electrical signal to the radio processor 22, as the uplink signal. Further, the antenna 21 may include a transmission antenna and a reception antenna that are separate from each other. Because the radio processor 22 transmits (notifies) the downlink signal, the radio processor 22 is thus an example of a radio transmission device (radio notification device).

The radio processor 22 converts the downlink signal received from the control device 25 into an analog signal, and superimposes the analog signal onto a carrier wave having a radio frequency specified by the control device 25. In addition, the radio processor 22 amplifies the downlink signal superimposed on the carrier wave to a desired level by a high-power amplifier (not illustrated), and transfers the amplified downlink signal to the antenna 21.

Moreover, the radio processor 22 amplifies the uplink signal received from the antenna 21 by a low-noise amplifier (not illustrated). The radio processor 22 multiplies a periodic signal having an intermediate frequency to the amplified uplink signal, to convert the frequency of the amplified uplink signal from the radio frequency to a baseband frequency. Next, the radio processor 22 subjects the uplink signal having the baseband frequency to an analog-to-digital conversion, and supplies the digitally converted uplink signal to the control device 25. Because the radio processor 22 receives the uplink signal, the radio processor 22 is an example of a radio reception device.

The cable interface device 23 includes a communication interface circuit for connecting the base station 11 to the host node 13 and another base station. The cable interface device 23 analyzes the signal received from the host node 13 according to a S1 interface, and extracts the downlink signal and a control signal included in the received the signal. Further, the cable interface device 23 analyzes the signal received from the other base station according to a X2 interface, and extracts the control signal included in the received signal. The cable interface device 23 supplies the downlink signal and the control signal that are extracted, to the control device 25. Because the cable interface device 23 receives the signal from the host node 13, the cable interface device 23 is an example of a reception device.

On the other hand, the cable interface device 23 converts the uplink signal received from the control device 25 into a signal having a format in accordance with the S1 interface, and outputs the converted uplink signal to the host node 13. In addition, the cable interface device 23 converts the control signal to be transmitted to the other base station, into a signal having a format in accordance with the X2 interface. Further, the cable interface device 23 outputs (or transmits or notifies) the converted control signal to the other base station. Because the cable interface device 23 transmits or notifies the control signal to the other base station, the cable interface device 23 is an example of a notification device (or transmission device).

The storage device 24 includes a non-volatile semiconductor memory that is not rewritable, and a volatile semiconductor memory or a non-volatile semiconductor memory that is rewritable. In addition, the storage device 24 stores various information used for communicating with the radio terminal 12, various information transmitted from or received by the base station 11, various programs running on the base station 11, or the like. In this embodiment, the storage device 24 stores information related to the Resume function with respect to the radio terminal 12 that is connected to the base station 11, that is, the line setting information, and the corresponding Resume ID.

The control device 25 includes one or a plurality of processors, and a peripheral circuit, for example. In addition, the control device 25 modulates and superimposes the downlink signal according to modulation and superimposing scheme employed by the communication standard to which the radio communication system 1 conforms. Further, the control device 25 supplies the modulated and superimposed downlink signal to the radio processor 22. For example, the control device 25 modulates and superimposes the downlink signal according to the F-OFDM.

On the other hand, the control device 25 separates the uplink signal received from the radio processor 22, according to the modulation and superimposing scheme employed by the communication standard to which the radio communication system 1 conforms, and demodulates the separated signal that is received. For example, the control device 25 separates and demodulates the uplink signal according to the F-OFDM. Then, the control device 25 outputs the demodulated uplink signal to the cable interface device 23. Further, the control device 25 extracts various signals referred to by the base station 11, such as the control information related to call control, or communication quality measurement information at the radio terminal 12, or the like, from the demodulated uplink signal.

The control device 25 performs various processes for performing the radio communication, such as transmission power control and the call control, or the like. The control device 25 also performs various processes related to the Resume function.

Figure 6:
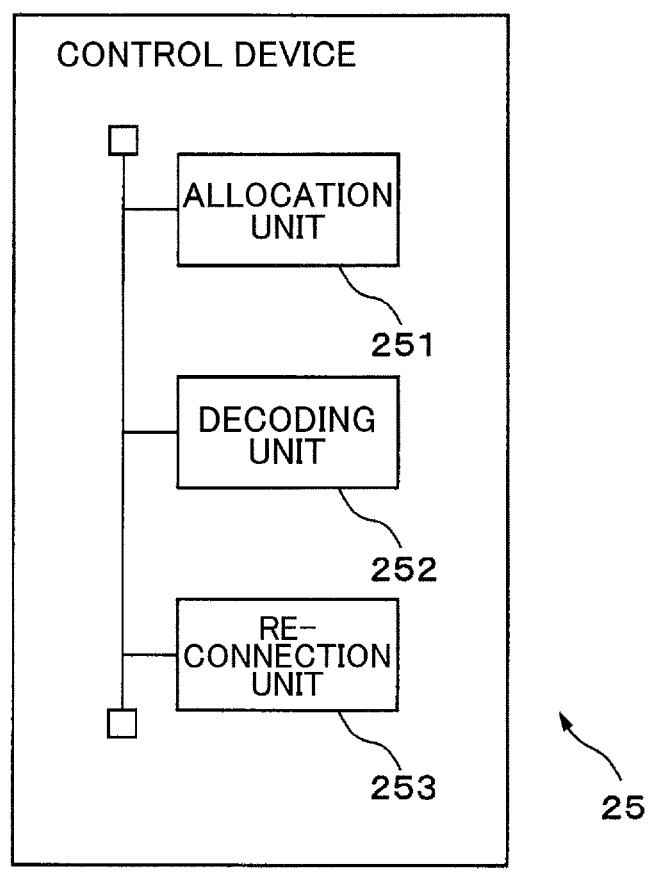
FIG. 6 is a functional block diagram illustrating a control device of the base station related to the Resume function.

FIG. 6 is a functional block diagram illustrating the control device 25 related to the Resume function. The control device 25 includes an allocation unit 251, a decoding unit 252, and a reconnection unit 253. Each of these parts of the control device 25 is a functional module implemented by a computer program running on the processor of the control device 25, for example. Alternatively, each of these parts of the control device 25 may be an exclusive computing circuit that is embedded in the processor of the control device 25.

The allocation unit 251 allocates the Resume ID corresponding to the line setting information, when the line setting information is set with respect to the radio terminal 12. In addition, the allocation unit 251 stores the allocated Resume ID, together with the line setting information, in the storage device 24. Moreover, the allocation unit 251 generates a downlink control signal including the allocated Resume ID. Further, the allocation unit 251 transmits the downlink control signal to the radio terminal 12 via the radio processor 22 and the antenna 21, while the radio terminal 12 is in the RRC Connected state.

As described above, the Resume ID may be allocated for each radio terminal 12, or allocated for each service provided to the radio terminal 12. In the case where a plurality of services are provided to the radio terminal 12, the allocation unit 251 may generate the downlink control signal including a plurality of Resume IDs, allocated for each of the services provided, and transmit the control signal to the radio terminal 12 via the radio processor 22 and the antenna 21. Further, in the case where the transmittable timing is set for each sub-range of the value of the Resume ID, the allocation unit 251 may generate a signal (or control signal, control information) indicating the transmittable timing for each sub-range. In addition, the allocation unit 251 may transmit the signal to the radio terminal 12 that is in the RRC Connected state, by the PDCCH or the PDSCH, via the radio processor 22 and the antenna 21.

The decoding unit 252 performs the descrambling process or the despreading process with respect to the received radio signal, using each of the stored Resume IDs, for each timing having the possibility of receiving the uplink signal from the radio terminal 12 that is in the RRC Inactive state. In the case where the transmittable timing is set for each sub-range of the value of the Resume ID, the decoding unit 252 may perform the descrambling process or the despreading process using only the Resume ID belonging to the sub-range corresponding to the timing, among the stored Resume IDs.

In addition, in the case where the scramble code or the spread code generated using the Resume ID is used for the scrambling or the spreading of the data, the decoding unit 252 also generates the scramble code or the spread code using the Resume ID, for each Resume ID. Similarly, in a case where the scramble code or the spread code that is used is generated from a combination of the Resume ID and the identification information of the terminal, the decoding unit 252 generates the scramble code or the spread code using the Resume ID and the identification information of the terminal, for each combination of the Resume ID and the identification information of the terminal. The decoding unit 252 may perform the descrambling process using the generated scramble code, or perform the despreading process using the generated spread code.

The decoding unit 252 may generate the scramble code or the spread code in advance, every time a new Resume ID is allocated, and store the generated scramble code or spread code in the storage device 24. In addition, the decoding unit 252 may read the scramble code or the spread code from the storage device 24 and use the same, every time the descrambling process or the despreading process is performed. Accordingly, the amount of computation can be reduced, because the decoding unit 252 does need to generate the scramble code or the spread code every time the descrambling process or the despreading process is performed.

The decoding unit 252 notifies the decoded RA preamble or uplink data to the reconnection unit 253, when the descrambling process or the despreading process is performed and the RA preamble or the uplink data is successfully decoded. Further, the decoding unit 252 notifies the Resume ID that is used when the decoding is successful, to the reconnection unit 253.

The decoding unit 252 judges that the decoding is successful, when an error detection is performed using an error detection code that is added to the data obtained by performing the descrambling process or the despreading process, for example, and the detected error is within a tolerable range. The error detection code added to the data may be a Cyclic Redundancy Check (CRC) code, for example. In addition, an error correction code may be added to the data in place of the error detection code. In this case, the decoding unit 252 judges that the decoding is successful, when an error correction is performed using the error correction code that is added to the data obtained by performing the descrambling process or the despreading process, for example, and the data error is correctable by the error correction.

In the case where the radio terminal 12 is reconnected according to the communication procedure 1, the reconnection unit 253 identifies the line setting information corresponding to the Resume ID that is used when the decoding of the uplink data is successful. Further, the reconnection unit 253 transmits the uplink data to the host node 13 via the cable interface device 23, according to the identified line setting information. In addition, the reconnection unit 253 generates the reconnection enabling signal, and transmits the reconnection enabling signal to the radio terminal 12 via the radio processor 22 and the antenna 21.

On the other hand, in the case where the radio terminal 12 is reconnected according to the communication procedure 2, the reconnection unit 253 identifies the line setting information corresponding to the Resume ID that is used when the decoding of the RA preamble or the uplink data is successful. Further, the reconnection unit 253 transmits the uplink data to the host node 13 via the cable interface device 23, according to the identified line setting information. In addition, the reconnection unit 253 generates the RA response and the reconnection enabling signal, and transmits the RA response and the reconnection enabling signal to the radio terminal 12 according to the communication procedure 2, via the radio processor 22 and the antenna 21.

Figure 7:
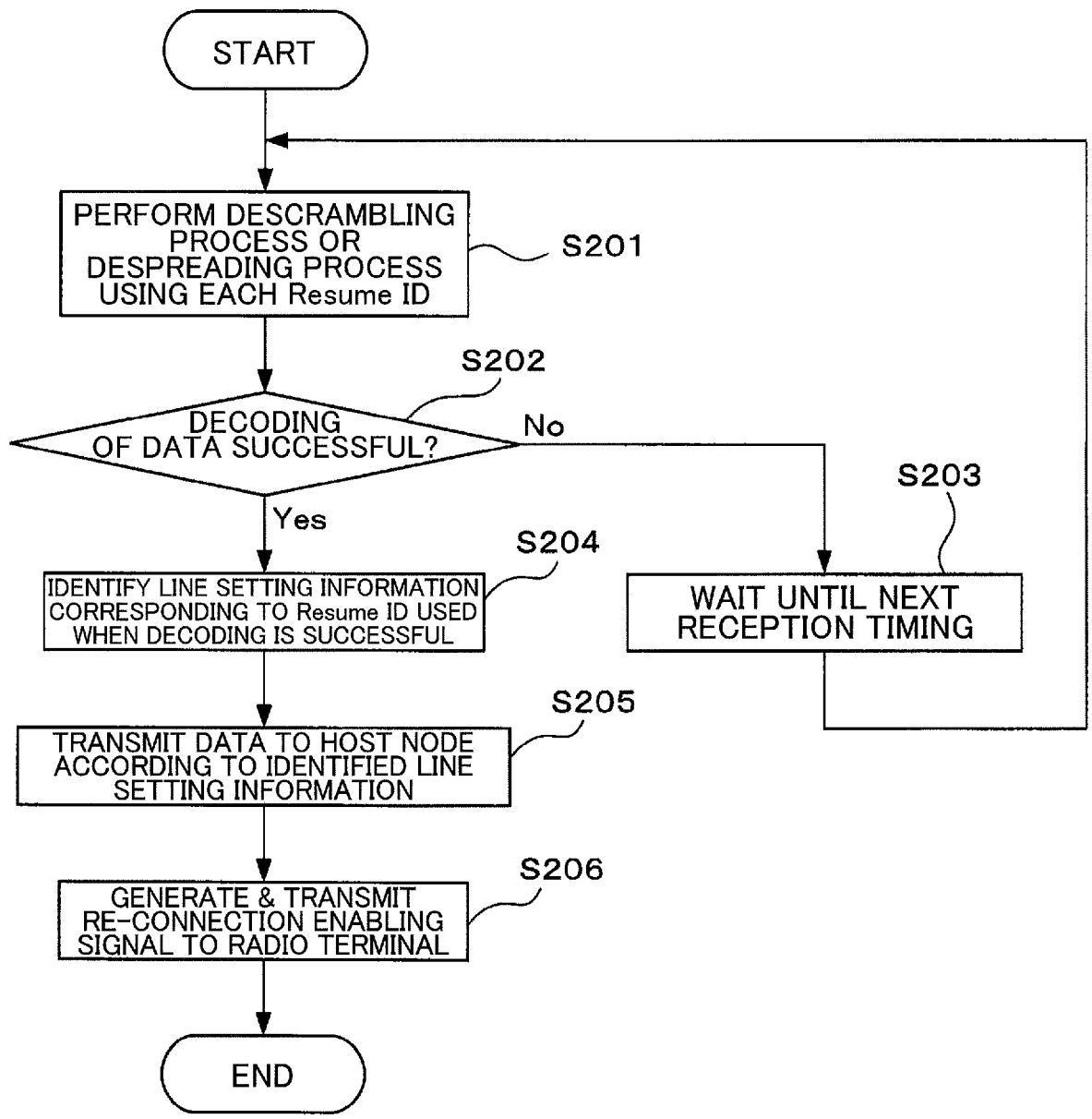
FIG. 7 is an operation flow chart illustrating the radio communication process using the Resume function, performed by the control device of the base station.

FIG. 7 is an operation flow chart illustrating the radio communication process using the Resume function, performed by the control device 25.

The decoding unit 252, at a reception timing having the possibility of receiving the radio signal from the radio terminal 12 that is in the RRC Inactive state, uses each Resume ID that is stored, to perform the descrambling process or the despreading process with respect to the received radio signal (step S201). Then, the decoding unit 252 judges whether the decoding of the RA preamble or the uplink data is successful (step S202).

In a case where the RA preamble nor the uplink data is recoded (No in step S202), the base station 11, at the reception timing, does not receive the radio signal from the radio terminal 12 that is in the RRC Inactive state. Hence, the decoding unit 252 waits until a next reception timing (step S203). Thereafter, the control device 25 performs the process of step S201 and subsequent steps.

On the other hand, in a case where the RA preamble or the uplink data is decoded (Yes in step S202), the decoding unit 252 notifies the decoded RA preamble or uplink data, together with the Resume ID that is used when the decoding is successful, to the reconnection unit 253.

The reconnection unit 253 identifies the line setting information corresponding to the Resume ID that is used when the decoding is successful (step S204). In addition, the reconnection unit 253 transmits the decoded uplink data to the host node 13 via the cable interface device 23, according to the identified line setting information (step 205). Further, the reconnection unit 253 transmits the reconnection enabling signal or the like to the radio terminal 12, via the radio processor 22 and the antenna 21 (step S206). Then, the control device 25 ends the radio communication process using the Resume function.

Figure 8:
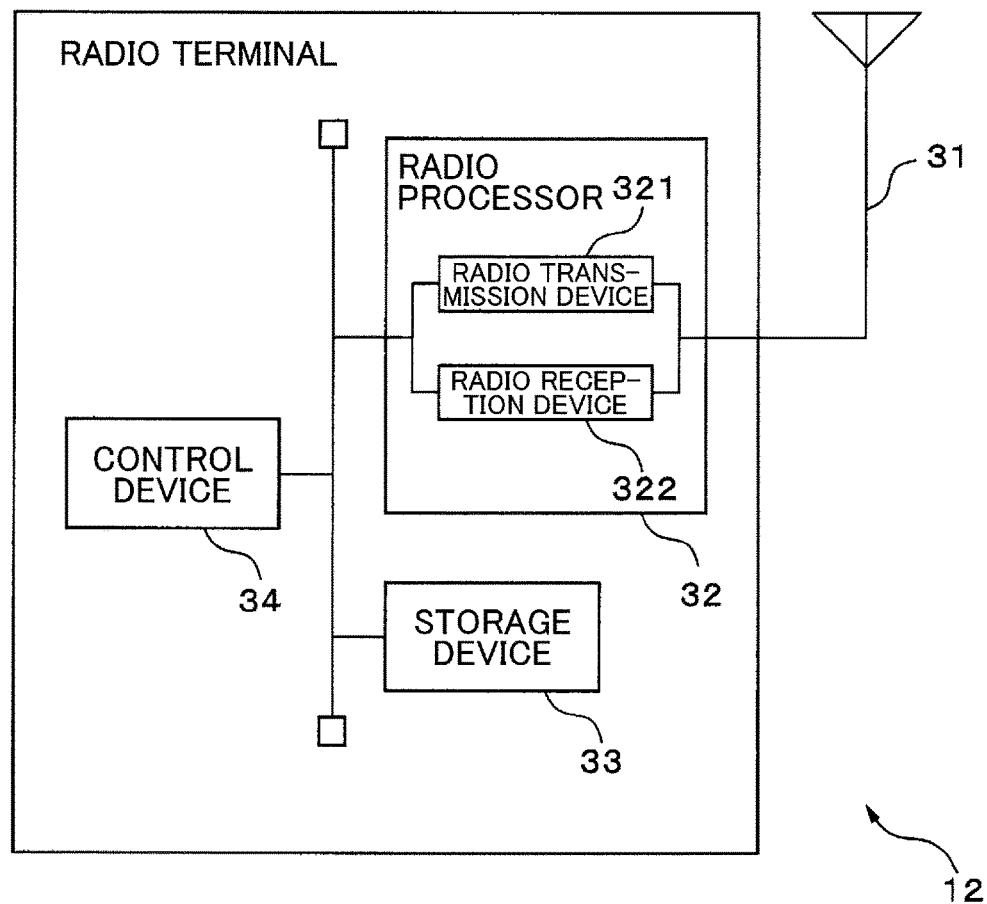
FIG. 8 is a diagram illustrating a general configuration of a radio terminal.

FIG. 8 is a diagram illustrating a general configuration of the radio terminal 12. The radio terminal 12 includes an antenna 31, a radio processor 32, a storage device 33, and a control device 34. In addition, the radio processor 32 includes a radio transmission device 321, and a radio reception device 322. The radio terminal 12 may further include at least one of a user interface (not illustrated), such as a touchscreen panel, a microphone (not illustrated), a speaker (not illustrated), and a camera (not illustrated). Further, the radio terminal 12 may include a Global Positioning System (GPS) receiver (not illustrated), in order to measure the position of the radio terminal 12. Moreover, the radio processor 32, the storage device 33, and the control device 34 may be formed as separate circuits, respectively. Alternatively, each of these parts may be formed by one or a plurality of integrated circuits in which circuits corresponding to these parts are integrated, and the radio terminal 12 may be mounted with such one or plurality of integrated circuits. Further, the radio transmission device 321 and the radio reception device 322 may be implemented in the radio terminal 12 as separate circuits, or may be implemented in the radio terminal 12 as a single integrated circuit including the functions of the radio transmission device 321 and the radio reception device 322.

The antenna 31 transmits the uplink signal transferred via the radio transmission device 321 of the radio processor 32, as the radio signal. In addition, the antenna 31 receives and converts the radio signal from the radio station 11 into an electrical signal, as the downlink signal, and transfers the downlink signal to the radio reception device 322 of the radio processor 32. Further, the antenna 31 may include a transmission antenna and a reception antenna that are separate from each other.

The radio transmission device 321 of the radio processor 32 converts the uplink signal received from the control device 34 into an analog signal, and superimposes the analog signal onto a carrier wave having a radio frequency specified by the control device 34. In addition, the radio transmission device 321 amplifies the uplink signal superimposed on the carrier wave to a desired level by a high-power amplifier (not illustrated), and transfers the amplified uplink signal to the antenna 31.

Moreover, the radio reception device 322 of the radio processor 32 amplifies the downlink signal received from the antenna 31 by a low-noise amplifier (not illustrated). The received downlink signal includes the line identification information such as the Resume ID, various control information including the sub-range of the Resume ID and the transmission timing set for the sub-range of the Resume ID, or the data having the radio terminal 12 as the destination thereof, or the like. The radio reception device 322 multiplies a periodic signal having an intermediate frequency to the amplified downlink signal, to convert the frequency of the amplified downlink signal from the radio frequency to a baseband frequency. Next, the radio reception device 322 subjects the downlink signal having the baseband frequency to an analog-to-digital conversion, and supplies the digitally converted downlink signal to the control device 34.

The storage device 33 includes a non-volatile semiconductor memory that is not rewritable, and a volatile semiconductor memory or a non-volatile semiconductor memory that is rewritable. In addition, the storage device 33 stores various information used for communicating with the base station 11, various information transmitted from or received by the radio terminal 12, various programs running on the radio terminal 12, or the like. The storage device 33 also stores the Resume ID notified from the base station 11, and the identification number of the radio terminal 12. Further, in a case where the transmittable timing for each sub-range of the value of the Resume ID is notified, the storage device 33 stores the transmittable timing for each sub-range.

The control device 34 includes one or a plurality of processors, and a peripheral circuit, for example. In addition, the control device 34 adds the error detection code such as the CRC code, or the error correction code, to the uplink signal, and modulates and superimposes the uplink signal according to the modulation and superimposing scheme employed by the communication standard to which the radio communication system 1 conforms. Further, the control device 34 supplies the modulated and superimposed uplink signal to the radio processor 32. For example, the control device 34 modulates and superimposes the uplink signal according to a superimposing scheme in conformance with the F-OFDM.

On the other hand, the control device 34 separates the downlink signal received from the radio processor 32, according to the modulation and superimposing scheme employed by the communication standard to which the radio communication system 1 conforms, and demodulates the separated signal that is received. For example, the control device 34 separates and demodulates the downlink signal according to the F-OFDM. Then, the control device 34 extracts various control information or data included in the signal that is received. The control device 34 performs a process according to the extracted control information or data. For example, in a case where the downlink signal includes an audio signal, the control device 34 reproduces the audio signal using the speaker. In addition, in a case where the downlink signal includes a video signal, the control device 34 reproduces the video signal using the touchscreen panel.

Further, the control device 34 performs various processes for forming the radio communication with the base station 11, such as a connection request process. The control device 34 may also perform a process to measure the quality of the received radio signal.

In addition, the control device 34 performs the process related to the Resume function, such as a process to make a transition from the RRC Connected state to the RRC Inactive state or vice versa, and the radio communication process for the case where the radio terminal 12 is in the RRC Inactive state. Further, in the case where at least one sub-range set for the Resume ID, and the transmission timing for each sub-range are received, the control device 34 stores the at least one sub-range set for the Resume ID, and the transmission timing for each sub-range, in the storage device 33.

Figure 9:
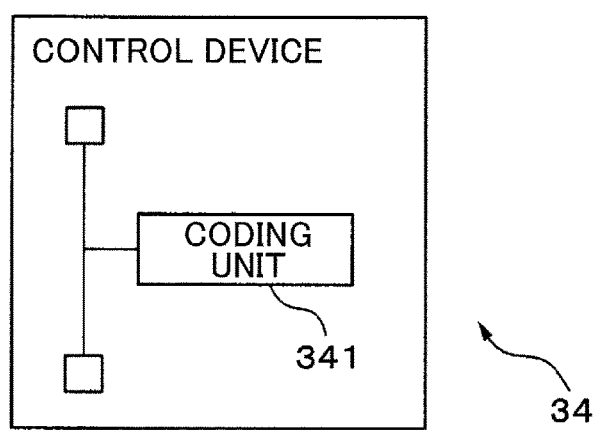
FIG. 9 is a functional block diagram illustrating a control device of the radio terminal related to the Resume function.

FIG. 9 is a functional block diagram illustrating the control device 34 related to the Resume function. The control device 34 includes a coding unit 341. The coding unit 341 is a functional module implemented by a computer program running on a processor of the control device 34, for example. Alternatively, the coding unit 341 may be an exclusive computing circuit that is embedded in the processor of the control device 34.

For example, in the case of the communication procedure 1 illustrated in FIG. 2, the coding unit 341 uses the Resume ID stored in the storage device 33, and scrambles or spreads the uplink data added with the error detection code or the error correction code. In this case, the coding unit 341 may use the Resume ID itself as the scramble code or the spread code, or the coding unit 341 may generate the scramble code or the spread code using the Resume ID, and use the generated scramble code or the generated spread code. Alternatively, the coding unit 341 may generate the scramble code or the spread code using the Resume ID and the identification number of the radio terminal 12, and use the generated scramble code or the generated spread code.

The radio terminal 12 may be receiving a plurality of services, and the Resume ID may be notified for each of the plurality of services. In this case, the coding unit 341 may use the Resume ID allocated for the service related to the uplink data to be transmitted, to scramble or spread the data.

The control device 34 generates a reconnection request signal including the scrambled or spread data, and transmits the reconnection request signal to the base station 11 via the radio processor 32 and the antenna 31. In the case where the transmittable timing for each sub-range of the Resume ID is notified, the control device 34 transmits the reconnection request signal to the base station 11 at the transmittable timing corresponding to the sub-range to which the Resume ID used for the scrambling or spreading belongs. When the reconnection enabling signal received from the base station 11 via the antenna 31 and the radio processor 32 includes the ACK, the control device 34 judges that the data is transmitted.

On the other hand, in the case of the communication procedure 2 illustrated in FIG. 3, the control device 34 generates the Message 1 of the random access procedure including the RA preamble, and transmits the Message 1 to the base station 11 via the radio processor 32 and the antenna 31. In this case, the coding unit 341 may also scramble or spread the RA preamble, using the Resume ID stored in the storage device 33.

In addition, the coding unit 341 scrambles or spreads the uplink data using the Resume ID. Further, the control device 34 generates the reconnection request signal including the scrambled or spread data.

When the control device 34 receives the RA response from the base station 11, the control device 34 synchronizes to (or adjusts the transmission timing with respect to) the base station 11 using the TA information included in the RA response, and transmits the reconnection request signal utilizing the resource instructed by the UL Scheduling Grant. In this case, the control device 34 may also judge that the data is transmitted, when the ACK is included in the reconnection enabling signal received from the base station 11 via the antenna 31 and the radio processor 32.

As described heretofore, in this radio communication system, when the radio terminal in the RRC Inactive state transmits the uplink signal, the radio terminal scrambles or spreads the signal using the Resume ID. Hence, even in the case where a plurality of radio terminals in the RRC Inactive state transmit the uplink signals, the collision of the signals at the base station can be prevented, and the base station can identify the uplink signal from each of the plurality of radio terminals. For this reason, the base station does not need to notify the transmission timing and the usable radio resource with respect to the radio terminal, at a timing before the radio terminal transmits the uplink signal. In addition, the radio terminal does not need to transmit a transmission enabling request to the base station, nor notify an amount of accumulated data, at a timing before transmitting the uplink signal. On the other hand, the radio terminal can transmit the uplink signal, even when the base station does not transmit a transmission enable including the UL Scheduling Grant to the radio terminal. Accordingly, this radio communication system can reduce the increase of the traffic of the control information when the radio terminal in the RRC Inactive state transmits the uplink signal. As a result, this radio communication system can reduce the time it takes for the radio terminal to be able to transmit the uplink signal.

According to the embodiments described above, it is possible to provide a radio terminal that can reduce an increase of traffic of control information when the radio terminal transmits data, in a case where a radio line between the radio terminal and a base station is disconnected, and a host line between the base station and a host node, used by the radio terminal to communicate via the base station, is maintained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A radio terminal comprising:
 a radio reception device configured to receive Resume ID information related to a setting of a host line between a base station and a host node, and a radio signal from the base station, when a radio line between the radio terminal and the base station is disconnected, and the host line used by the radio terminal to communicate via the base station is maintained;
a control device configured to scramble or spread a signal to be transmitted to another communication device or the base station, using the Resume ID information; and
a radio transmission device configured to transmit the scrambled or spread signal to the base station when requesting a reconnection with respect to the base station,
wherein the control device scrambles or spreads the signal using a combination of both the Resume ID information and identification number of the radio terminal, and transmits the scrambled or spread signal to the base station.

2. The radio terminal as claimed in claim 1, wherein the control device generates a scramble code using the Resume ID information, and scrambles the signal using the scramble code.

3. The radio terminal as claimed in claim 1, wherein the control device generates a scramble code using both the Resume ID information and the identification number of the radio terminal, and scrambles the signal using the scramble code.

4. The radio terminal as claimed in claim 1, wherein
a range of possible values for the Resume ID information is divided into a plurality of sub-ranges, and a transmittable timing is set for each of the plurality of sub-ranges, and
the control device transmits the scrambled or spread signal to the base station at a timing that is set for one of the plurality of the sub-ranges to which the Resume ID information belongs.

5. A base station comprising:
a control device configured to allocate Resume ID information, related to a setting of a host line between the base station and a host node, to a radio terminal, when a radio line between the radio terminal and the base station is disconnected, and the host line used by the radio terminal to communicate via the base station is maintained; and
a radio processor configured to notify the allocated Resume ID information to the radio terminal, and receive a scrambled or spread signal transmitted from the radio terminal which requests a reconnection with respect to the base station,
wherein the control device descrambles or despreads the received signal using the Resume ID information, and
wherein the control device descrambles or despreads the scrambled or spread signal from the radio terminal, received via the radio processor, using a combination of the Resume ID information and identification number of the radio terminal.

6. The base station as claimed in claim 5, further comprising:
a storage device configured to store a plurality of Resume ID information, and line setting information for setting the host line corresponding to each of the plurality of Resume ID information,
wherein the control device descrambles or despreads the signal using each of the plurality of Resume ID information, and transmits the signal to the host node using the line setting information corresponding to the Resume ID information that is used when decoding of the signal is successful.

7. The base station as claimed in claim 5, wherein
the control device divides a range of possible values for the Resume ID information into a plurality of sub-ranges, and sets transmission timings with respect to each of the plurality of sub-ranges, and
the radio processor notifies control information, including at least one of the set transmission timings corresponding to the plurality of sub-ranges, to the radio terminal.

8. The base station as claimed in claim 5, further comprising:
a storage device configured to store a plurality of sub-ranges into which a range of possible values for the Resume ID information is divided, and transmission timings set with respect to each of the plurality of sub-ranges.

9. The base station as claimed in claim 7, further comprising:
a storage device configured to store the plurality of Resume ID information,
wherein the control device descrambles or despreads the signal using one of the plurality of Resume ID information that belongs to one of the plurality of sub-ranges corresponding to a timing at which the signal is received.

10. A radio communication system comprising:
a base station; and
a radio terminal,
wherein the radio terminal uses Resume ID information related to a setting of a host line between the base station and a host node, to scramble or spread a signal to be transmitted to another communication device or the base station, when a radio line between the radio terminal and the base station is disconnected, and the host line used by the radio terminal to communicate via the base station is maintained, and transmit the scrambled or spread signal to the base station when requesting a reconnection with respect to the base station, wherein the radio terminal scrambles or spreads the signal using a combination of both the Resume ID information and identification number of the radio terminal, and transmits the scrambled or spread signal to the base station, and
wherein the base station uses the Resume ID information to descramble or despread the scrambled or spread signal received from the radio terminal which requests the reconnection, wherein the base station descrambles or despreads the scrambled or spread signal from the radio terminal, received via a radio processor, using the combination of the Resume ID information and the identification number of the radio terminal.

* * * * *